US010939256B1

(12) United States Patent
Shcherbakov et al.

(10) Patent No.: US 10,939,256 B1
(45) Date of Patent: Mar. 2, 2021

(54) TECHNIQUES FOR ROUTING MESSAGES IN A COMMUNICATIONS NETWORK

(71) Applicant: Bandwidth, Inc., Raleigh, NC (US)

(72) Inventors: Roman Shcherbakov, Chapel Hill, NC (US); Emma Bradley, Denver, CO (US); Matt Garcia, Rochester, NY (US); David Ress, Cary, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 16/935,273

(22) Filed: Jul. 22, 2020

(51) Int. Cl.
*H04W 4/14* (2009.01)
*H04W 88/18* (2009.01)
*H04L 29/08* (2006.01)
*H04L 12/58* (2006.01)

(52) U.S. Cl.
CPC ............... *H04W 4/14* (2013.01); *H04L 51/14* (2013.01); *H04L 67/04* (2013.01); *H04W 88/184* (2013.01)

(58) Field of Classification Search
CPC ...... H04W 4/14; H04W 88/184; H04L 67/04; H04L 51/14
USPC .......... 455/166.2, 428, 435.3, 445, 466, 512
See application file for complete search history.

(56) References Cited

U.S. PATENT DOCUMENTS

| 6,857,026 B1 * | 2/2005 | Cain ..................... H04L 45/00 370/389 |
| 10,455,595 B2 * | 10/2019 | Tietsch ................. H04L 65/80 |
| 2004/0001497 A1 * | 1/2004 | Sharma ................. H04L 45/48 370/401 |

* cited by examiner

*Primary Examiner* — Michael Y Mapa
(74) *Attorney, Agent, or Firm* — Gregory Stephens

(57) ABSTRACT

A message delivery network may receive a message from a sending message service provider. The message delivery network may identify an end user carrier servicing the end user device for the message. The message delivery network may retrieve a pre-determined rank ordered list of message routes from the message delivery network to the end user carrier. The message delivery network may determine whether each message route is currently unavailable or demonstrating poor deliverability. The message delivery network may de-prioritize the message routes that are demonstrating poor deliverability. The message delivery network may update the rank ordered list of message routes based on the de-prioritized message routes. The message delivery network may attach the updated rank ordered list of message routes to the message. The message delivery network may forward the message to a gateway within the message delivery network. The gateway may deliver the message using the highest ranked message route. Other embodiments are described herein.

27 Claims, 6 Drawing Sheets

TECHNIQUES FOR ROUTING MESSAGES IN A COMMUNICATIONS NETWORK

TECHNICAL FIELD

Examples described herein are generally related to techniques for routing messages through a message delivery network from a sending messaging service provider to an end user carrier servicing a destination device of an end user.

BACKGROUND

A message delivery network may receive a message from an external sending service provider that is intended for an external message recipient. There may be multiple message routes available to the message delivery network to deliver the message to the end user. Each message route may have pros and cons to it. For instance, some message routes may be more costly to use than others. Some message routes may be more reliable with respect to deliverability of the message than others. Some message routes may be temporarily experiencing network issues that impact the ability of the message to be delivered. However, message delivery networks do not often prioritize message routes when delivering messages. This may lead to cost inefficiencies and poor delivery rates especially if the message delivery network continuously attempts delivery over a message route that is currently experiencing technical difficulties. What is needed are systems and methods for dynamically determining the best message route to use in delivering a message.

SUMMARY

According to some implementations, a method routing messages through a message delivery network may include receiving a message into a message delivery network from a sending message service provider; identifying an end user carrier servicing the end user device for the message; retrieving a pre-determined rank ordered list of message routes from the message delivery network to the end user carrier; determining whether each message route is currently unavailable or demonstrating poor deliverability; de-prioritizing the message routes that are demonstrating poor deliverability; updating the rank ordered list of message routes based on the de-prioritized message routes; attaching the updated rank ordered list of message routes to the message; forwarding the message to a gateway within the message delivery network; and delivering the message using the highest ranked message route.

According to some implementations, the method routing messages through a message delivery network may further include determining whether the message delivery was successful based on an acknowledgment notification; when the message delivery was not successful, determining whether all the message routes on the rank ordered list have been attempted; and when all the message routes on the rank ordered list have not been attempted, delivering the message using the next highest ranked message route.

According to some implementations, the method for routing messages through a message delivery network may further include determining whether a timeout condition has occurred once all the message routes on the rank ordered list have been attempted; and returning a message indicative that the message was not delivered to the sending service provider once the timeout condition has occurred.

According to some implementations, the method for routing messages through a message delivery network may further include restarting delivery of the message according to the rank ordered list when the timeout condition has not occurred.

According to some implementations, the method for routing messages through a message delivery network may further include determining all possible message routes to the end user carrier; retrieving a cost to send the message for each possible message route; retrieving historic deliverability reliability of message routes; retrieving any minimum commitments to use message routes; weighting the cost, reliability, and minimum commitment data according to a predetermined set of weighting factors; and ranking the message routes according to the weighting factors.

According to some implementations, the method for routing messages through a message delivery network may further include initializing the current message route status to good; setting the current message route status to poor when bind events are indicative of poor deliverability; setting the current message route status to poor when message events are indicative of poor deliverability; and repeating until all message routes have been checked.

According to some implementations, the method for routing messages through a message delivery network may further include determining a degree of poor deliverability for each message route having a message route status of poor; and editing the rank ordered list by re-ranking the message routes placing those with the poorest degree of deliverability to the bottom of the list.

According to some implementations, a message delivery network may include one or more memories; and one or more processors, communicatively coupled to the one or more memories, configured to: receive a message into a message delivery network from a sending message service provider; identify an end user carrier servicing the end user device for the message; retrieve a pre-determined rank ordered list of message routes from the message delivery network to the end user carrier; determine whether each message route is currently unavailable or demonstrating poor deliverability; de-prioritize the message routes that are demonstrating poor deliverability; update the rank ordered list of message routes based on the de-prioritized message routes; attach the updated rank ordered list of message routes to the message; forward the message to a gateway within the message delivery network; and deliver the message using the highest ranked message route.

According to some implementations, the message delivery network may be further configured to determine whether the message delivery was successful based on an acknowledgment notification from a receiving service provider indicating they are ready to handle the message coupled with a delivery receipt from an end user carrier; when the message delivery was not successful, determine whether all the message routes on the rank ordered list have been attempted; and when all the message routes on the rank ordered list have not been attempted, deliver the message using the next highest ranked message route.

According to some implementations, the message delivery network may be further configured to determine whether a timeout condition has occurred once all the message routes on the rank ordered list have been attempted; and return a response message indicative that the message was not delivered to the sending service provider once the timeout condition has occurred.

According to some implementations, the message delivery network may be further configured to restart delivery of the message according to the rank ordered list when the timeout condition has not occurred.

According to some implementations, the message delivery network may be further configured to determine all possible message routes to the end user carrier; retrieve a cost to send the message for each possible message route; retrieve historic deliverability reliability of message routes; retrieve any minimum commitments to use message routes; weight the cost, reliability, and minimum commitment data according to a predetermined set of weighting factors; and rank the message routes according to the weighting factors.

According to some implementations, the message delivery network may be further configured to initialize the current message route status to good; set the current message route status to poor when bind events are indicative of poor deliverability; set the current message route status to poor when message events are indicative of poor deliverability; and repeat until all message routes have been checked.

According to some implementations, the message delivery network may be further configured to determine a degree of poor deliverability for each message route having a message route status of poor; and edit the rank ordered list by re-ranking the message routes placing those with the poorest degree of deliverability to the bottom of the list.

DETAILED DESCRIPTION

Figure 1:
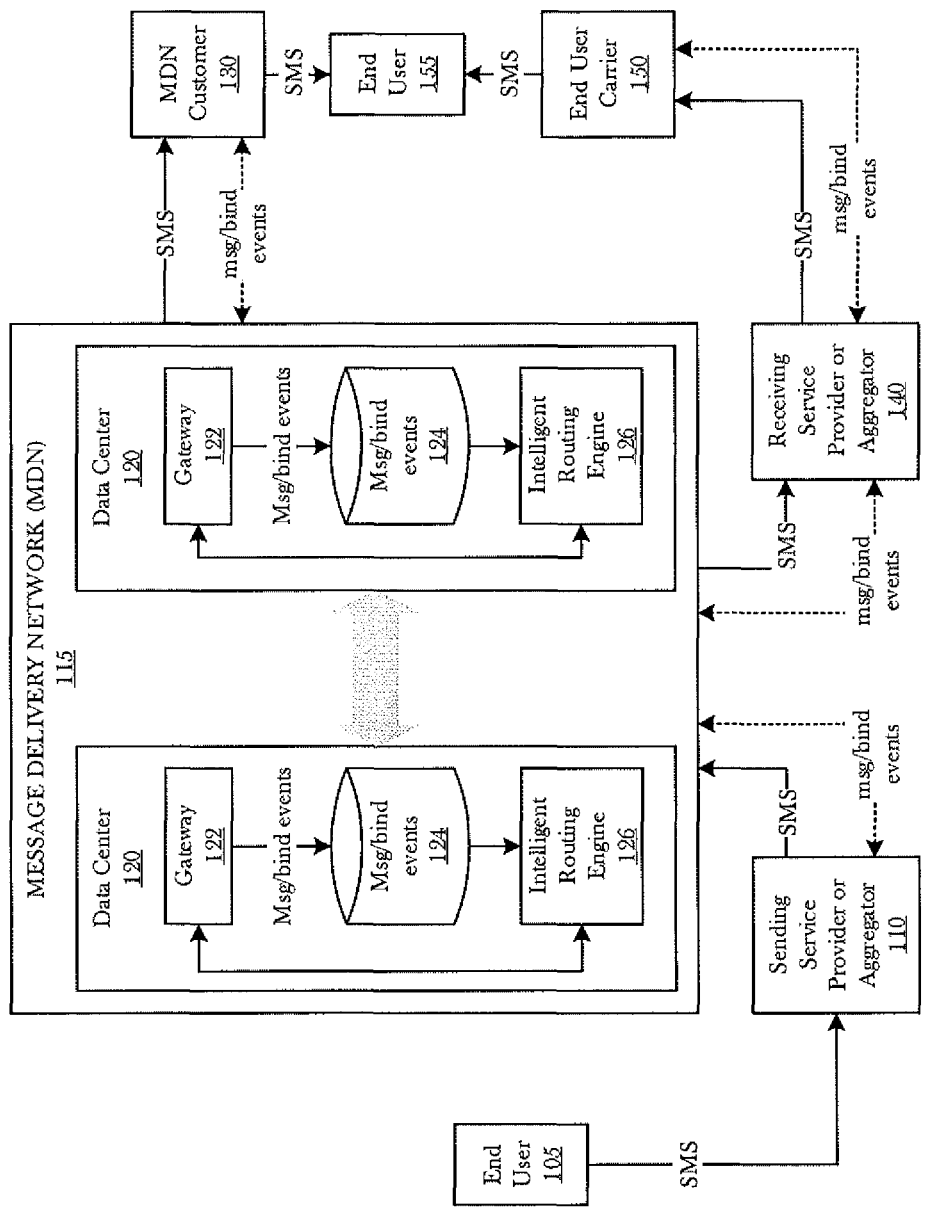
FIG. 1 illustrates an example network architecture according to an embodiment.

Various embodiments may include systems, methods, apparatuses, and techniques to route messages through a message delivery network from a sending messaging service provider to an end user carrier servicing a destination device of an end user.

In some embodiments, a message delivery network may be comprised of one or more data centers each operable to receive and route a message. The messages may be short message service (SMS) messages, multi-media message service (MMS) messages, or other data or text based messages, notifications, alerts, or the like. Each data center may include, among other components, a gateway for receiving messages from an external node/entity and sending messages to an external node/entity, a database of message and bind events, and an intelligent routing engine. It is noted the message delivery network is only a portion of path traversed from message sending device to message receiving device.

In the embodiments described herein, the message delivery network may receive a message from an external sending service provider that is intended for an external message recipient. There may be multiple message routes available to the message delivery network to deliver the message to the end user. Each message route may have pros and cons to it. For instance, some message routes may be more costly to use than others. Some message routes may be more reliable with respect to deliverability of the message than others. Some message routes may be temporarily experiencing network issues that impact the ability of the message to be delivered.

When a message is received into a gateway within the message delivery network it may be parsed to determine the end user carrier (i.e., the carrier that services the destination end user device). An intelligent routing engine may then determine all possible message routes that may be utilized to deliver the message to that end user carrier. These message routes may then be statically analyzed to determine a rank ordered list of most preferable route to least preferable route. There may be multiple factors used to statically rank the message routes including cost to route, historical reliability of the message route, whether there are contractual commitments pertaining to the message route, etc. The result is a static rank ordered list of message routes to be used to deliver the current message. The static rank ordered list assumes that current network conditions are normal meaning that whatever message route is chosen will be able to deliver the message. This assumption, however, may not always be true as various components, nodes, and intermediate service providers may experience technical difficulties from time to time.

The embodiments described below take another step in the message delivery process to check the 'health' of the message routes on the static rank ordered list. By determining if one or more of the potential message routes is currently experiencing poor deliverability, the intelligent routing engine within the message delivery network may re-rank the static rank ordered list to de-prioritize message routes that are currently experiencing poor deliverability.

The updated rank ordered list may then be appended to the message so that the gateway may route the message to the highest ranked message route. Should that route fail to deliver the message for whatever reason, the gateway may work its way down the updated rank ordered list of message routes until the message is delivered as confirmed by a delivery receipt and/or a msg_accepted acknowledgement notification.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example network architecture 100 according to an embodiment. Following the flow of a message, a sending end user device 105 creates and sends a message intended for a second end user device 155. For example, the message may be an SMS or MMS message or other message like a notification, alert, or other text/data based message. The end user device 105 may be a mobile phone owned by a subscriber to a mobile phone carrier network. In other embodiments, the end user may be a computer of a customer, the customer receiving services from a messaging service provider. The message is transmitted from the end user device 105 to a sending service provider or aggregator 110. The sending service provider 110 may be a mobile phone carrier network in the case of a mobile phone subscriber end user. In other embodiments, the sending service provider 110 may be a customer to the message delivery network owner. In the case of an aggregator 110, the aggregator 110 may be an entity that acts as message broker that serves to receive and forward messages between carriers and/or message service providers.

The message may then be presented to a message delivery network (MDN) 115 from either a sending service provider 110 or an aggregator 110 where it may be received by a data center 120. More specifically, the message may be received by a gateway 122 within a data center 120. It should be noted that the message delivery network may comprise multiple data centers 120 for geographical efficiency, load balancing, and/or redundancy purposes. The gateway 122 may then forward the message to an intelligent routing engine 126. The intelligent routing engine 126 may then use the message data, such as "to" and "from" telephone numbers in the message to determine its destination specifically an end user carrier 150 destination. In some embodiments, there may not be an end user carrier 150 because the message may be intended for an end user device 155 that is the customer of a direct customer of the MDN 115 referred to in FIG. 1 as an MDN customer 130. Knowing the end user destination allows the intelligent routing engine 126 to build a list of message routes from the MDN 115 to the end user carrier 150.

When the end user device 155 is serviced by an MDN customer 130, the MDN 115 will typically always route the message directly to the MDN customer 130 without having to use one or more receiving service providers or aggregators 140. When the end user device 155 is serviced by end user carrier 150, the MDN 115 will route the message through one or more receiving service providers or aggregators 140. In these cases there are typically multiple message routes available for the MDN 115 to use to deliver the message to the end user carrier 150. The intelligent routing engine 126 will compile a list of the potential message routes and apply a static set of rules to rank order the message routes from most preferable to least preferable resulting in a static rank ordered list of message routes.

The intelligent routing engine 126 may utilize multiple data points to determine the static rank ordered routing list including, but not limited to, the cost to route the message over a particular message route (K), the recent historical reliability of the message route (HR), and any contractual commitments to utilize a particular message route (CM). Each of these factors may be scored and weighted to determine the ranking of message routes using, for instance a simple normalized weighting function that sums each weighted factor. One example formula may be rank value=xK+yHR+zCM, where x, y, and z are weighting factors that sum to 1. K may be the actual cost per message inversely normalized to a scale range of 1-100, HR may be a reliability score between 1-100, and CM may be commitment score also between 1-100. K may be inversely normalized because lower cost per message is better than higher cost per message. By normalizing all the factors to values between 1-100 it ensures that no individual factor overwhelms the others regardless of the weighting factor applied. The sum—rank value—will fall between 3-100 where the greater the rank value for a message route the more preferable the message route.

The cost to route a message may vary from message route to message route by fractions of a penny. However, these fractions add up to significant sums when the volume of messages is taken into account. For instance, the weighting factors may be skewed to prioritize cost over reliability and contractual commitment such that x=0.7, y=0.2, and z=0.1. In another example, the MDN 115 may be behind on its contractual commitment to utilize a particular aggregator and may skew the ranking in favor of CM such that x=0.1, y=0.1, and z=0.8. One of ordinary skill in the art can readily apply additional, other, or different weighting factors to obtain different static ranking results. Moreover, the static ranking rules may be changed at any time to reflect the needs of the MDN 115.

The intelligent routing engine 126 does not stop with the creation of the static rank ordered list of message routes, however. The intelligent routing engine 126 may then determine a deliverability metric for each message route at the time of delivery. This may be done to ensure a message is not delivered over a message route that is currently down or impaired in some fashion. The intelligent routing engine 126 performs this analysis by examining message events and bind events stored in a msg/bind event database 124.

A message event is indicative of an outcome as represented by a notification or acknowledgment issued in the due course of sending and receiving messages. For instance, a message accepted (msg_accepted) acknowledgment may be returned from an aggregator or receiving message service provider 140 each time a message is delivered to that aggregator or receiving message service provider 140. When the aggregator or receiving message service provider 140 returns the msg_accepted acknowledgment, the MDN 115 logs the event in the msg/bind event database 124 including a timestamp. The absence of a msg_accepted acknowledgment may also be logged the msg/bind event database 124 and associated with a particular message and timestamp. Similarly, a message delivery receipt (msg_delivery_rcpt) may be returned from an end user carrier 150 each time a message is delivered to that end user carrier 150. When the end user carrier 150 returns a message delivery receipt, the MDN 115 logs the event in the msg/bind event database 124 including a timestamp. The absence of a message delivery receipt may also be logged the msg/bind event database 124 and associated with a particular message and timestamp.

A bind event is indicative of the health of the connection between the MDN 115 and one or more links on the way to the end user carrier 150. Typically, a bind request is used to establish a connection with a receiving service provider or aggregator 140. Establishment of the bind may then be logged in the msg/bind event database 124. Once established, the bind should remain operable until an unbind request is executed or some other unexpected event terminates the bind. An enquire link request may be issued periodically to ensure the bind is still operable. This request (enquire_link) and its corresponding response (enquire_link_resp) may be performed by the intelligent routing engine 126 frequently and the results logged in the msg/bind event database 124.

The intelligent routing engine 126 may then determine the relative 'health' of each message route on the static rank ordered list by examining the current and very recent bind events and message events associated with a message route. Based on a determination that the message route is experiencing poor deliverability characteristics, the intelligent routing engine 126 may re-prioritize the static rank ordered list to demote any message routes exhibiting poor deliverability characteristics. The updated rank ordered list of message routes may then be appended to the message and forwarded to the gateway 122 for delivery using the message route at the top of the rank ordered list of message routes. Should this message route fail to deliver the message, the gateway may then re-attempt delivery of the message using the next highest ranked message route. This process will continue until the message is successfully delivered or all the message routes have been attempted. In the case where none of the message routes successfully delivered the message, the gateway will restart the entire process until a predetermined timeout occurs. Should the timeout occur prior to successful delivery of the message, a 'message failed' acknowledgment may be sent from MDN 115 back the entity (e.g., sending service provider or aggregator 130) that sent the message to the MDN for delivery.

Figure 2:
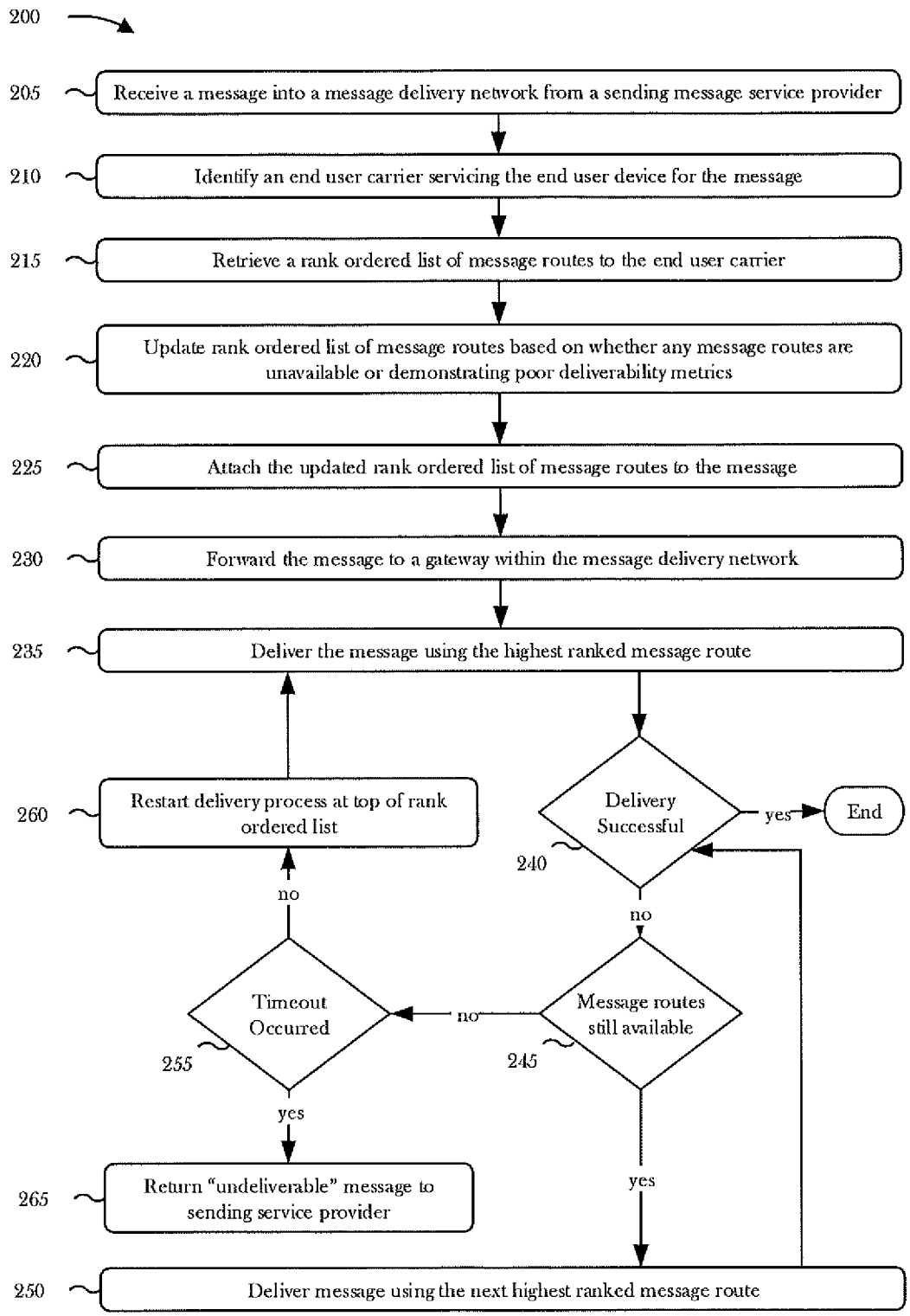
FIG. 2 illustrates a first logic flow diagram according to an embodiment.
Figure 3:
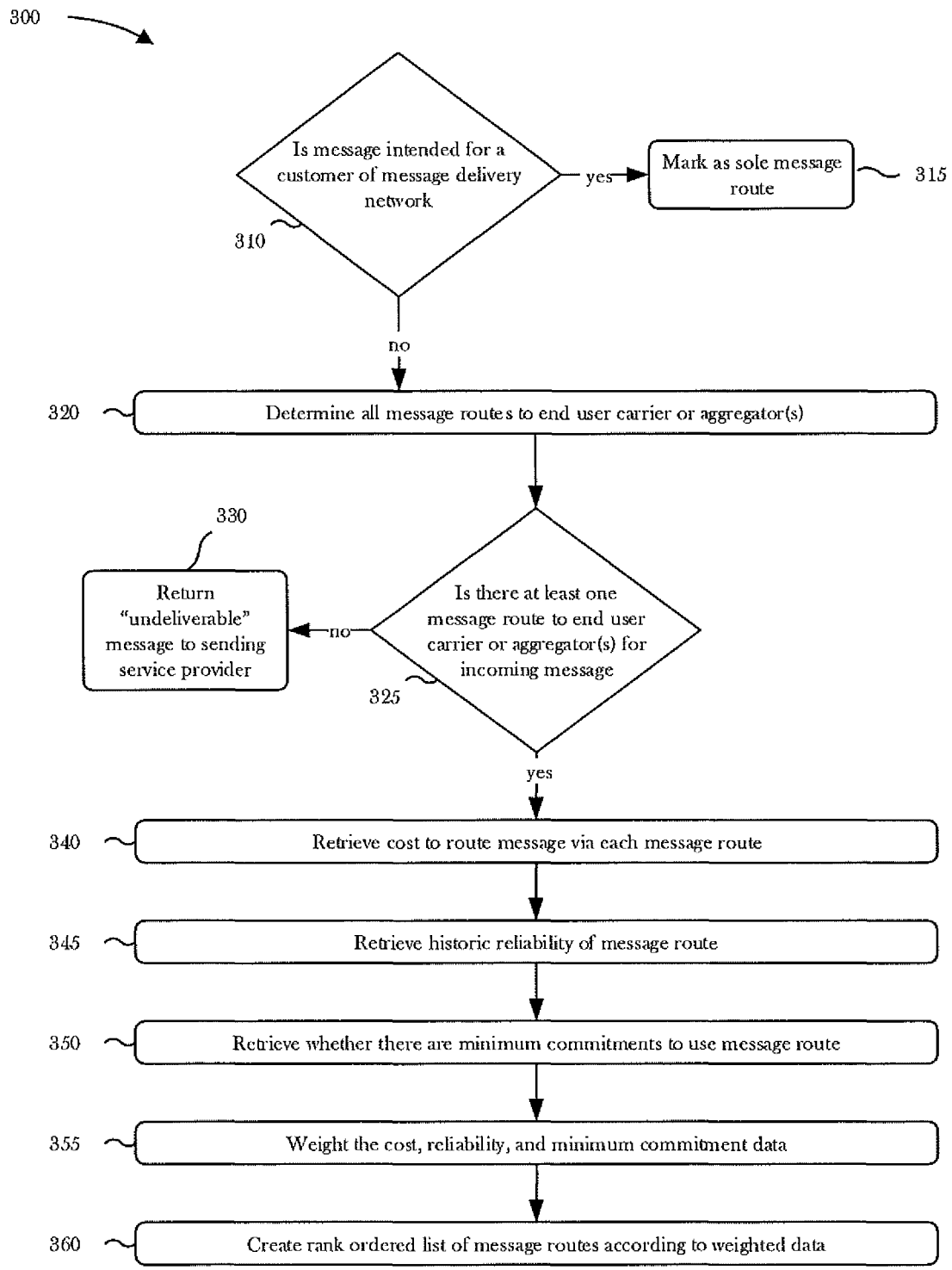
FIG. 3 illustrates a second logic flow diagram according to an embodiment.
Figure 4:
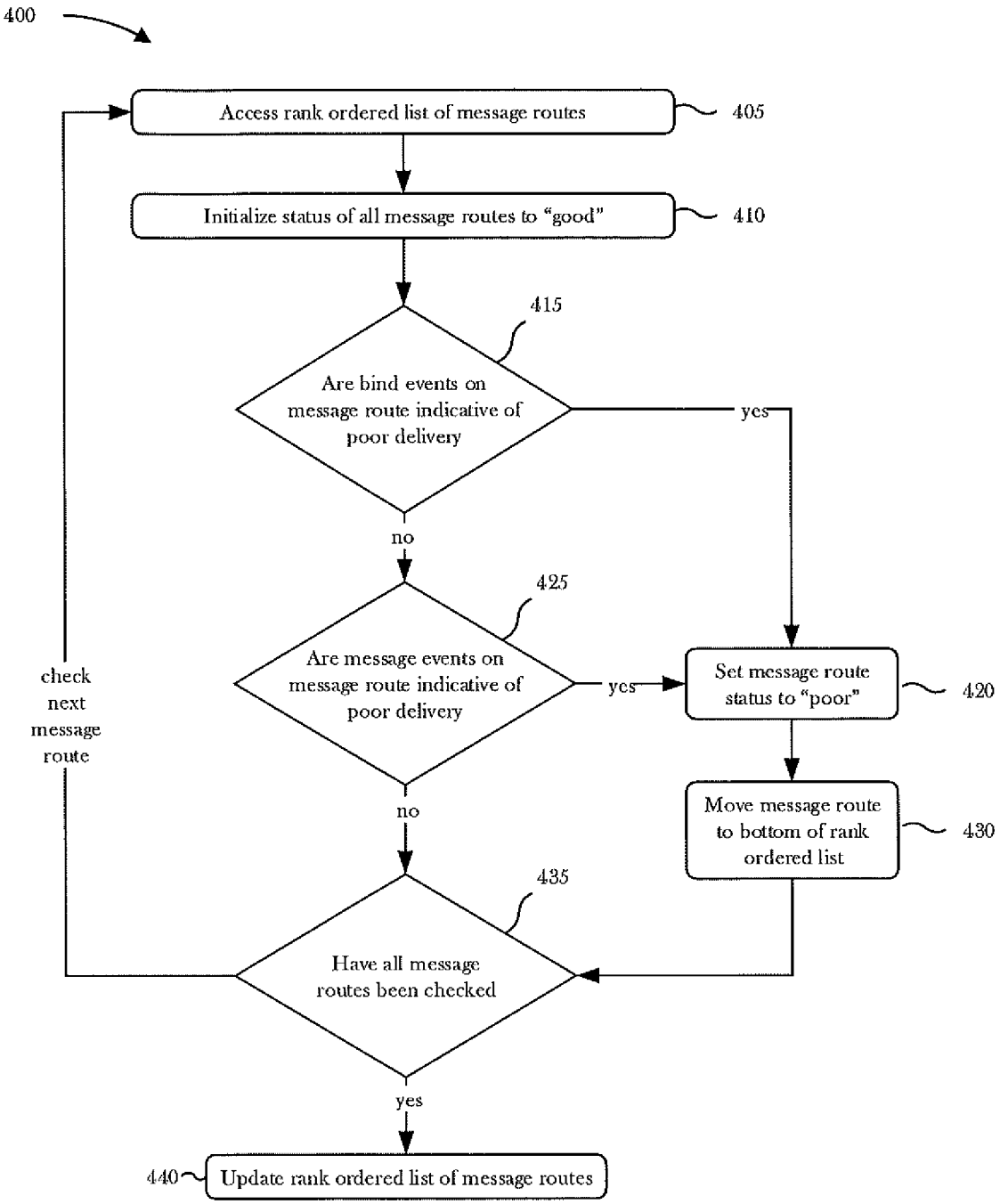
FIG. 4 illustrates a third logic flow diagram according to an embodiment.

FIGS. 2-4 illustrate set of logic flows. These logic flows may be representative of some or all of the operations executed by one or more logic, features, or devices described herein, such as any devices or systems described above with references to other figures herein. In the illustrated examples shown in FIGS. 2-4, the logic flows may comprise one or more steps or processes involved in routing messages as described elsewhere herein. The embodiments, however, are not limited to the number, type, order or arrangement of steps shown in FIGS. 2-4.

As shown in FIG. 2, in some aspects, process 200 may include receiving a message into a message delivery network 115 from a sending message service provider 110 (block 205). For example, the message may be received via a gateway 122 within a data center 120 of a message delivery network 115 from a sending message service provider 110 that originated from an end user 105.

Process 200 may further include identifying an end user carrier 150 servicing an intended recipient end user device 155 for the message (block 210). For example, the gateway 122 may identify an end user carrier 150 servicing the end user device 155 for the message, or the gateway may pass the message to an intelligent routing engine 126 and have the intelligent routing engine 126 identify the end user carrier 150.

Process 200 may further include retrieving a pre-determined rank ordered list of message routes from the message delivery network 115 to the end user carrier (block 215). For example, the intelligent routing engine 126 may retrieve a pre-determined or static rank ordered list of message routes from the message delivery network 115 to the end user carrier.

The process of determining the static rank ordered list is described more fully in reference to FIG. 3 below.

Process 200 may further include updating the rank ordered list of message routes based on determining whether each message route is currently unavailable or demonstrating poor deliverability (block 220). For example, the intelligent routing engine 126 may check a msg/bind events database 124 to determine if a particular message route is currently or has very recently experienced poor deliverability issues. The process of updating the rank ordered list is described more fully in reference to FIG. 4 below.

Process 200 may further include attaching the updated rank ordered list of message routes to the message (block 225). For example, the intelligent routing engine 126 may attach the updated rank ordered list of message routes to the message.

Process 200 may further include forwarding the message to a gateway 122 within the message delivery network 115 (block 230). For example, the intelligent routing engine 126 may forward the message to the gateway 122 of a data center 120 within the message delivery network 115.

Process 200 may further include delivering the message using the highest ranked message route (block 235). For example, gateway 122 may deliver the message using the highest ranked message route to the next node/entity as specified in the chosen message route.

Process 200 may include additional aspects, such as any single aspect or any combination of aspects described below and/or in connection with one or more other processes described elsewhere herein.

In a first aspect, process 200 may further include determining whether the delivery attempt was successful (decision block 240). For example, gateway 122 may or may not receive an expected delivery receipt acknowledgment. In addition, one or more other message events and/or bind events may be received in relation to the delivery attempt to indicate whether it was successful.

Process 200 may then determine whether there are additional message routes still available to try should the delivery attempt over the last message route come back as unsuccessful (decision block 245). For example, the intelligent routing engine 126 or gateway 122 may check whether the rank ordered list of message routes has been exhausted.

When all the message routes on the rank is ordering list have not been attempted, process 200 may then attempt to deliver the message using the next highest ranked message route (block 250). For example, the gateway 122 may increment to the next highest ranked message route on the rank ordered list and initiate delivery of the message over that message route. Control of process 200 may then be returned to decision block 240 to determine whether this latest attempt to deliver the message was successful.

When all the message routes on the rank is ordering list have been attempted according to decision block 245, process 200 may then determine whether a timeout condition has occurred (decision block 255). For example, the gateway 122 may determine what the timeout setting is and determine whether a timeout has occurred since the initial delivery attempt of the message.

When the timeout condition is determined as having occurred, process 200 may then return a response message indicative that the message was not delivered to the sending service provider (block 265). When the timeout condition is determined as having not occurred, control of process 200 may be returned to block 235 where delivery of the message according to the rank ordered list may be restarted.

Although FIG. 2 shows example blocks of process 200, in some aspects, process 200 may include additional blocks, fewer blocks, different blocks, or differently arranged blocks than those depicted in FIG. 2. Additionally, or alternatively, two or more of the blocks of process 200 may be performed in parallel.

FIG. 3 illustrates an example of a second logic flow 300 directed toward the creation of a static rank ordered list of message routes from the message delivery network 115 to an end user carrier 150. As shown in FIG. 3, in some aspects, process 300 may include determining if the message to be sent is intended for an MDN customer 130 (decision block 310). For example, the intelligent routing engine 126 may parse the message destination and determine if the end user device 155 is associated with an MDN customer 130. Typically, the destination telephone number of the message will provide this information. For instance, the telephone number may be owned and/or assigned by the message delivery network 115 to a particular MDN customer 130. When the message is intended for an MDN customer 130, process 300 may then mark a sole message route for the message as a direct bind between message delivery network 115 and MDN customer 130 (block 315). This may be done as it is likely the most cost efficient and reliable message route possible.

When the message is not intended for an MDN customer 130, process 300 may further include determining all possible message routes to the end user carrier (block 320). For example, the intelligent routing engine 126 may determine and identify how many different binds or connections it may use to deliver a message to a particular end user carrier 150. The paths or message routes between the message delivery network 115 and the end user carrier 150 may include one or more aggregators 140 as well as one or more receiving service providers 140. Each path may have different characteristics.

Process 300 may then determine whether there is at least one message route between the message delivery network 115 and the end user carrier 150 (decision block 325). When there is not is at least one message route between the message delivery network 115 and the end user carrier 150, the message delivery network 115 may return a "message undeliverable" message to the sending service provider 110 (block 330).

When there is at least one message route between the message delivery network 115 and the end user carrier 150, process 300 may then begin to analyze each message route. For instance, intelligent routing engine 126 may retrieve a cost to send the message for each possible message route (block 340), retrieve historic deliverability reliability for each possible message route (block 345), and retrieve any minimum commitments to use each particular message route (block 350). Blocks 340, 345, 350, 355, and 360 may occur on a temporal basis (e.g., once daily, hourly, etc.) or on a per message basis.

If done on a temporal basis, the static rank ordered list created using process 300 may be a global list of all possible message routes available to the message delivery network 115 to reach all possible end user carriers 150. Then, for each message presented, a subset of the rank ordered list that applies to the specific end user carrier 150 could be extracted and used.

Process 300 may then weight the cost, reliability, and minimum commitment data according to a predetermined set of weighting factors (block 355). For example, a formula for weighting each of the characteristics may be created that allows an operator to decide which factor(s) should count more than others. The operator may preset the weighting factors so that they are normalized and sum to 1. For instance, 0.5 weighted to cost to route, 0.35 weighted to reliability of message route, and 0.15 weighted to message routes to which the message delivery network has certain commitments to use is a valid formula that prioritizes cost above reliability and commitments.

It should be noted that the static formula should be applied to each message route for a given message presented for delivery to obtain a message ranking score. It should also be noted that the static formula weighting factors may be changed from time to time to reflect different priorities for the message delivery network 115 or sending side customers of the message delivery network. For example, the message delivery network 115 may prioritize a minimum commitment weighting factor in the last few days of a month if the message delivery network 115 is in danger of not meeting a agreed upon quota that triggers a financial penalty. Similarly, message delivery network 115 may prioritize reliability for one of it's most important customers in an effort to keep that customer from receiving elevated levels of message timeout notifications or undeliverable messages.

It should further be noted that other characteristics may be considered as weighting factors, Regardless of the static formula applied, each message route may receive a raw score based on the static weighted factor formula. Process 300 may then rank the message routes according to the weighting factors and raw scores (block 360) to create a rank ordered list of message routes to use for the message presented to be delivered.

FIG. 4 illustrates an example of a third logic flow 400 directed toward the determination of the status of the message routes from the message delivery network 115 to an end user carrier 150. As shown in FIG. 4, in some aspects, process 400 may include accessing the rank ordered list of message routes (block 405). For example, intelligent routing engine 126 may access the static rank ordered list of message routes created in process 300 described above.

Process 400 may then initialize the current message route status of all message routes to good (block 410). This may be done as a mechanism to presume each message route is good unless demonstrated otherwise by executing the rest of the steps of process 400.

Process 400 may then determine whether any bind events associated with the message route currently being checked are indicative of poor message delivery (decision block 415). For example, intelligent routing engine 126 may consult the message/bind events database 124 to lookup if there have been any bind events recorded recently that apply to any binds that may be used by the message route currently being evaluated. If any such bind events exist, the intelligent routing engine 126 may then determine whether they rise to the level of characterizing the message route as experiencing poor deliverability. For instance, the number, type, and recentness of the bind events factor into a determination of poor deliverability. Consider a bind on a message route that has had its link terminated and re-established multiple times over the last few minutes. Such a pattern may be indicative of network or node issues that constitute poor deliverability over the last few minutes. Until this pattern changes, as indicated by positive bind events and/or a lack of negative bind events, the message route being evaluated may be flagged and its message route status set to poor (block 420).

When there are no bind events indicative of poor deliverability for a message route as determined in decision block 415, process 400 then determines whether there are any message events recorded recently that apply to the message route currently being evaluated (decision block 425). If any such message events exist in the message/bind events database 124, the intelligent routing engine 126 may then determine whether they rise to the level of characterizing the message route as experiencing poor deliverability. For instance, the number, type, and recentness of the message events factor into a determination of poor deliverability. Consider a message route that has had timeouts, no msg_accepted, and/or no message delivery receipts multiple times over the last few minutes. Such a pattern may be indicative of network or node issues that constitute poor deliverability over the last few minutes. Until this pattern changes, as indicated by positive message events and/or a lack of negative message events, the message route being evaluated may be flagged and its message route status set to poor (block 420).

Once a message route status is set to poor, that message route is moved to the bottom of the static rank ordered list (block 430). Process 400 may then determine whether all the message routes have been evaluated (decision block 435) and, if not, return control to block 405 where the next message route in the static rank ordered list is queued up for evaluation. Thus, process 400 may be repeated until all message routes have been checked. Once all the message routes have been evaluated, the intelligent routing engine 126 creates an updated rank ordered list of message routes (block 440). The updated rank ordered list of message routes differs from the static rank ordered list of message routes in that message routes currently exhibiting poor delivery characteristics have been moved to the bottom thereby ensuring message routes with a current "good" route status are attempted before message routes with "poor" route status. When a message route deemed poor is moved to the bottom of the list, it still maintains its priority over other message routes deemed poor because lower initially ranked message routes are processed in order and will automatically be placed at the bottom of the updated rank ordered list. This may have the effect of increasing the likelihood that a message presented for delivery to an end user carrier 150 is delivered reliably and according to the preferred prioritization of the message delivery network 115.

Figure 5:
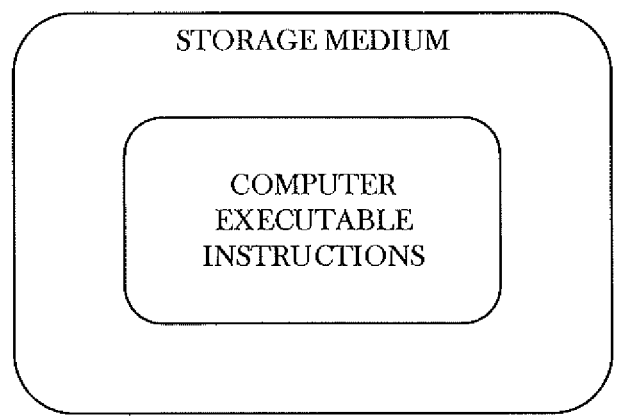
FIG. 5 illustrates an example of a storage medium.

FIG. 5 illustrates an embodiment of a first storage medium. As shown in FIG. 5, the first storage medium includes a storage medium 500. Storage medium 500 may comprise an article of manufacture. In some examples, storage medium 500 may include any non-transitory computer readable medium or machine-readable medium, such as an optical, magnetic or semiconductor storage. Storage medium 500 may store various types of computer executable instructions, such as instructions to implement one or more of logic flows as described above. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, assembly code, machine code, and the like. The examples are not limited in this context.

Figure 6:
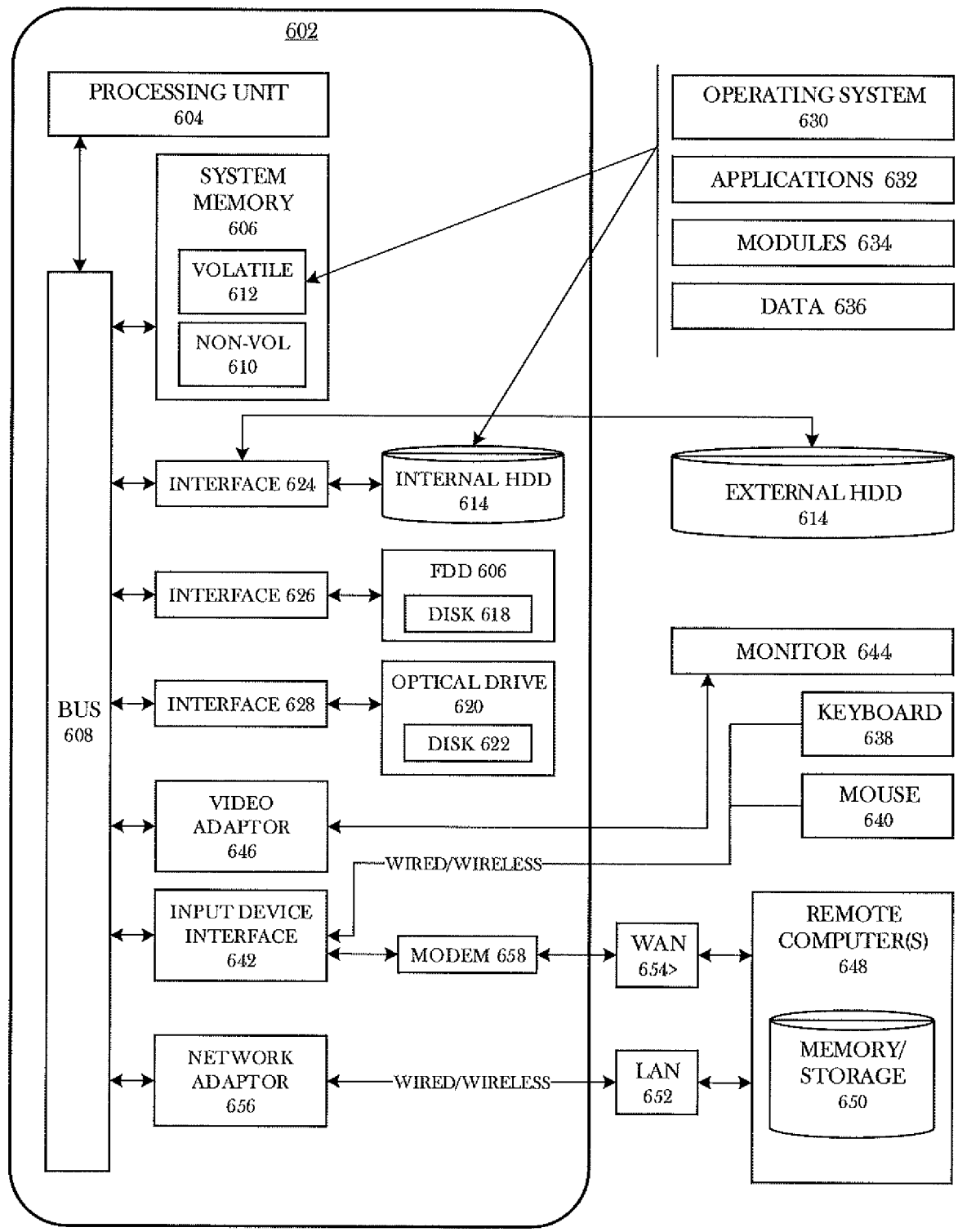
FIG. 6 illustrates an example of a computer device.

FIG. 6 illustrates an embodiment of an exemplary computing architecture 600 suitable for implementing various embodiments as previously described. In one embodiment, the computing architecture 600 may comprise or be implemented as part of an electronic device. The embodiments are not limited in this context.

As used in this application, the terms "system", "module", and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. <p> When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A method of routing messages to an end user device, comprising:
   receiving a message into a message delivery network from a sending message service provider;
   identifying an end user carrier servicing the end user device for the message;
   retrieving a pre-determined rank ordered list of message routes from the message delivery network to the end user carrier;
   determining whether each message route is currently unavailable or demonstrating poor deliverability;
   de-prioritizing the message routes that are demonstrating poor deliverability;
   updating the rank ordered list of message routes based on the de-prioritized message routes;
   attaching the updated rank ordered list of message routes to the message;
   forwarding the message to a gateway within the message delivery network; and
   delivering the message using the highest ranked message route.

2. The method of claim 1, the message comprising a short message service (SMS) message.

3. The method of claim 1, the message comprising a multi-media message service (MMS) message.

4. The method of claim 1, further comprising:
   determining whether the message delivery was successful based on an acknowledgment notification;
   when the message delivery was not successful, determining whether all the message routes on the rank ordered list have been attempted; and
   when all the message routes on the rank ordered list have not been attempted, delivering the message using the next highest ranked message route.

5. The method of claim 4, further comprising:
   determining whether a timeout condition has occurred once all the message routes on the rank ordered list have been attempted;
   returning a message indicative that the message was not delivered to the sending service provider once the timeout condition has occurred.

6. The method of claim 5, further comprising:
   restarting delivery of the message according to the rank ordered list when the timeout condition has not occurred.

7. The method of claim 1, wherein creating the pre-determined rank ordered list comprises:
   determining all possible message routes to the end user carrier;
   retrieving a cost to send the message for each possible message route;
   retrieving historic deliverability reliability of message routes;
   retrieving any minimum commitments to use message routes;
   weighting the cost, reliability, and minimum commitment data according to a predetermined set of weighting factors; and
   ranking the message routes according to the weighting factors.

8. The method of claim 1, wherein determining whether each message route is demonstrating poor deliverability comprises:
   initializing the current message route status to good;
   setting the current message route status to poor when bind events are indicative of poor deliverability;
   setting the current message route status to poor when message events are indicative of poor deliverability; and
   repeating until all message routes have been checked.

9. The method of claim 8, wherein de-prioritizing the message routes that are demonstrating poor deliverability comprises:
   determining a degree of poor deliverability for each message route having a message route status of poor; and
   editing the rank ordered list by re-ranking the message routes placing those with the poorest degree of deliverability to the bottom of the list.

10. A message delivery network, comprising:
    one or more memories; and
    one or more processors communicatively coupled to the one or more memories, configured to:
       receive a message into a message delivery network from a sending message service provider;
       identify an end user carrier servicing the end user device for the message;
       retrieve a pre-determined rank ordered list of message routes from the message delivery network to the end user carrier;
       determine whether each message route is currently unavailable or demonstrating poor deliverability;
       de-prioritize the message routes that are demonstrating poor deliverability;
       update the rank ordered list of message routes based on the de-prioritized message routes;
       attach the updated rank ordered list of message routes to the message;
       forward the message to a gateway within the message delivery network; and
       deliver the message using the highest ranked message route.

11. The message delivery network of claim 10, the message comprising a short message service (SMS) message.

12. The message delivery network of claim 10, the message comprising a multi-media message service (MMS) message.

13. The message delivery network of claim 10, wherein the one or more processors are further configured to:
    determine whether the message delivery was successful based on an acknowledgment notification;
    when the message delivery was not successful, determine whether all the message routes on the rank ordered list have been attempted; and
    when all the message routes on the rank ordered list have not been attempted, deliver the message using the next highest ranked message route.

14. The message delivery network of 13, wherein the one or more processors are further configured to:
    determine whether a timeout condition has occurred once all the message routes on the rank ordered list have been attempted; and
    return a message indicative that the message was not delivered to the sending service provider once the timeout condition has occurred.

15. The message delivery network of claim 14, wherein the one or more processors are further configured to:
   restart delivery of the message according to the rank ordered list when the timeout condition has not occurred.

16. The message delivery network of claim 10, wherein the one or more processors, when creating the pre-determined rank ordered list, are configured to:
   determine all possible message routes to the end user carrier;
   retrieve a cost to send the message for each possible message route;
   retrieve historic deliverability reliability of message routes;
   retrieve any minimum commitments to use message routes;
   weight the cost, reliability, and minimum commitment data according to a predetermined set of weighting factors; and
   rank the message routes according to the weighting factors.

17. The message delivery network of claim 10, wherein the one or more processors, when determining whether each message route is demonstrating poor deliverability, are configured to:
   initialize the current message route status to good;
   set the current message route status to poor when bind events are indicative of poor deliverability;
   set the current message route status to poor when message events are indicative of poor deliverability; and
   repeat until all message routes have been checked.

18. The message delivery network of claim 17, wherein the one or more processors, when de-prioritizing the message routes that are demonstrating poor deliverability, are configured to:
   determine a degree of poor deliverability for each message route having a message route status of poor; and
   edit the rank ordered list by re-ranking the message routes placing those with the poorest degree of deliverability to the bottom of the list.

19. A non-transitory computer-readable medium storing instructions, the instructions comprising one or more instructions that, when executed by one or more processors, cause the one or more processors to:
   receive a message into a message delivery network from a sending message service provider;
   identify an end user carrier servicing the end user device for the message;
   retrieve a pre-determined rank ordered list of message routes from the message delivery network to the end user carrier;
   determine whether each message route is currently unavailable or demonstrating poor deliverability;
   de-prioritize the message routes that are demonstrating poor deliverability;
   update the rank ordered list of message routes based on the de-prioritized message routes;
   attach the updated rank ordered list of message routes to the message;
   forward the message to a gateway within the message delivery network; and
   deliver the message using the highest ranked message route.

20. The non-transitory computer-readable medium of claim 19, the message comprising a short message service (SMS) message.

21. The non-transitory computer-readable medium of claim 19, the message comprising a multi-media message service (MMS) message.

22. The non-transitory computer-readable medium of claim 19, wherein the one or more instructions, when executed by the one or more processors, further cause the one or more processors to:
   determine whether the message delivery was successful based on an acknowledgment notification;
   when the message delivery was not successful, determine whether all the message routes on the rank ordered list have been attempted; and
   when all the message routes on the rank ordered list have not been attempted, deliver the message using the next highest ranked message route.

23. The non-transitory computer-readable medium of claim 22, wherein the one or more instructions, when executed by the one or more processors, further cause the one or more processors to:
   determine whether a timeout condition has occurred once all the message routes on the rank ordered list have been attempted; and
   return a message indicative that the message was not delivered to the sending service provider once the timeout condition has occurred.

24. The non-transitory computer-readable medium of claim 23, wherein the one or more instructions, when executed by the one or more processors, further cause the one or more processors to:
   restart delivery of the message according to the rank ordered list when the timeout condition has not occurred.

25. The non-transitory computer-readable medium of claim 19, wherein the one or more instructions that cause the one or more processors to create the pre-determined rank ordered list, cause the one or more processors to:
   determine all possible message routes to the end user carrier;
   retrieve a cost to send the message for each possible message route;
   retrieve historic deliverability reliability of message routes;
   retrieve any minimum commitments to use message routes;
   weight the cost, reliability, and minimum commitment data according to a predetermined set of weighting factors; and
   rank the message routes according to the weighting factors.

26. The non-transitory computer-readable medium of claim 19, wherein the one or more instructions that cause the one or more processors to determine whether each message route is demonstrating poor deliverability, cause the one or more processors to:
   initialize the current message route status to good;
   set the current message route status to poor when bind events are indicative of poor deliverability;
   set the current message route status to poor when message events are indicative of poor deliverability; and
   repeat until all message routes have been checked.

27. The non-transitory computer-readable medium of claim 26, wherein the one or more instructions, that cause the one or more processors to de-prioritizing the message routes that are demonstrating poor deliverability, cause the one or more processors to:
   determine a degree of poor deliverability for each message route having a message route status of poor; and edit the rank ordered list by re-ranking the message routes placing those with the poorest degree of deliverability to the bottom of the list.

\* \* \* \* \*